Figure 1:
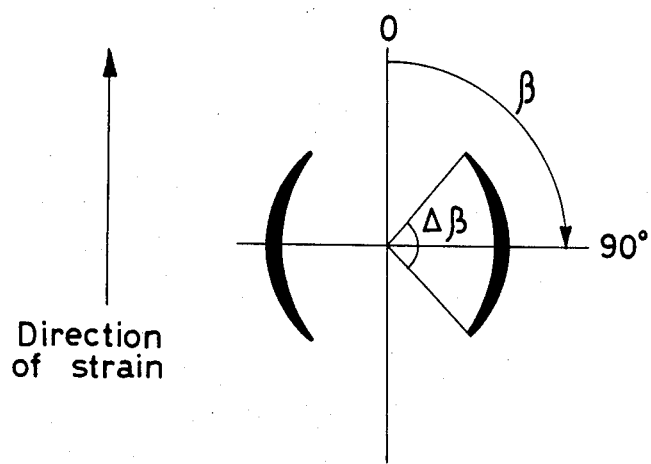

United States Patent [19]

Pedretti et al.

[11] Patent Number: 4,600,756

[45] Date of Patent: Jul. 15, 1986

[54] HIGH-ORIENTABILITY POLYACETYLENE FILMS AND PROCESS FOR THEIR PRODUCTION

[75] Inventors: Ugo Pedretti; Giovanni Perego, both of Milan; Gabriele Lugli, San Donato Milanese, all of Italy

[73] Assignee: Enichimica S.p.A., Milan, Italy

[21] Appl. No.: 518,397

[22] Filed: Jul. 29, 1983

[30] Foreign Application Priority Data

Aug. 3, 1982 [IT] Italy ................. 22722 A/82
May 27, 1983 [IT] Italy ................. 21349 A/83

[51] Int. Cl.$^4$ ............................................. C08F 38/02
[52] U.S. Cl. ................... 526/134; 526/159; 526/161; 526/166; 526/285
[58] Field of Search ............. 526/285, 161, 62, 166, 526/159, 134

[56] References Cited

U.S. PATENT DOCUMENTS 3,119,799  1/1964  Natta et al. ............... 526/159
3,256,235  6/1966  Natta et al. ............... 526/159 X
3,684,739  8/1972  Mottus et al. ............. 526/161 X
4,410,640  10/1983 Kobayashi et al. ......... 526/285 X
4,452,959  6/1984  Kobayashi et al. ......... 526/285 X

FOREIGN PATENT DOCUMENTS 0026234  10/1980  European Pat. Off. .
55-142012  11/1980 Japan .

OTHER PUBLICATIONS

Chemical Abstracts 93:47662c (Abstract of "Preparation and Morphology of As-Prepared and Highly Stretch-Aligned Polyacetylene", Hideki et al., Synth Met 1980 1(2), 175-84).

Primary Examiner—Paul R. Michl
Attorney, Agent, or Firm—Hedman, Gibson, Costigan & Hoare

[57] ABSTRACT

Novel polyacetylene films are disclosed, having the following properties:
elongation at break (1/10): higher than 4
tensile strength: higher than 100 MPa
ability of attaining under stretch high levels of molecular orientation in the direction of pull.

The process for preparing such polyacetylene films is also described.

10 Claims, 5 Drawing Figures

Direction of strain

| Experimental values of Δβ (degrees) | Corresponding type of material |
|---|---|
| < 25 | I |
| 25 – 35 | II |
| 35 – 50 | III |
| > 50 | IV |

Direction of strain

Direction of strain

Direction of strain

HIGH-ORIENTABILITY POLYACETYLENE FILMS AND PROCESS FOR THEIR PRODUCTION

This invention relates to novel acetylene polymers in film form, having a number of desirable properties such as elongation at break, tensile strength and molecular orientation under stretch.

The invention relates also to the process for preparing such polyacetylene films.

It is known in the art that it is possible to prepare acetylene polymers by polymerizing the monomer in the presence of a catalytic system which is generally composed of a compound of a transition metal and an organic-metallic compound of the elements of the Groups 1A, 2A, 3A and 4A of the Periodic Table. It is likewise known that it is possible to directly obtain from the polymerization said acetylene polymers in film form. However, no process known heretofore is in a position to furnish acetylene polymers in film form, or capable of being converted into films, which possess a desirable number of properties relative to the elongation at break, the tensile strength, and the molecular orientation upon stretching.

According to the conventional art, the acetylene polymers can be prepared in various morphological aspects and, more particularly:

in powder form (see: G. NATTA ET AL, REND..ACC.NAZ. LINCEI, SCIENZE FIS. MAT. NAT.: 25,3 (1958, Reference A). This publication reports the use of catalysts based on titanium alcoholates and aluminum trialkyls.

Crystalline and powdery polymers are thus obtained which can be compacted into brittle films having thus no mechanical resistance.

in the form of pliable films (see: Japanese Patent Application No. 32 581/73 (Reference B); Japanese Patent Application No. 142 012 of Nov. 6, 1980 (Reference C); European Patent Application No. 26 234 of Mar. 28, 1980 (Reference D).

The films thus obtained can be stretched with a draw ratio comprised in the range of from 2 to 2.8 working at room temperature. The molecular orientation, at any rate, is but a slight one.

in the form of lumpy polymers or partially gelled polymers (U.S. Pat. No. 4,228,060 (Reference E). These polymers are affected by the same limitations as those of Reference A and cannot be stretch-oriented. In addition, the catalysts used for polymerizing the monomer are of a particular kind and are somewhat expensive.

in the form of a gel-type material (European Patent Application No. 26 235 of Mar. 28, 1980: Reference G). In this case, the films obtained by compacting the polymer cannot be stretched and thus are nonorientable.

in the form of films obtained by polymerizing acetylene under shear-flow conditions (Synthetic Metals 4, 81 (1981): Reference H). The films as obtained by this method exhibit inadequate mechanical properties and, moreover, their relative electronic diffraction spectra exhibit a negligible preferential orientation when stretched.

It has now been found that it is possible to overcome the shortcomings of the conventional art and to polymerize acetylene in film form exhibiting unusually high values of the elongation at break and the tensile strength, along with the ability of attaining under stretch high levels of orientation in the direction of pull, similar to the levels which can be obtained with fibers.

The subject matter of the present invention is thus a novel polyacetylene film endowed with a number of desirable properties which cannot be found in the conventional acetylene polymers.

Another subject matter of the present invention is the objective of providing a process for the preparation of such polyacetylene films.

Other subject matters and objects of the present invention will become apparent as the present disclosure proceeds.

More particularly, according to the process of the present invention, acetylene is polymerized in film form having a thickness of from about 5 microns to about 1 millimiter (mm), working at a temperature of from $-100°$ C. to $+100°$ C. and under an acetylene pressure of from 0.01 to 2 atmospheres (atm), by contacting monomeric acetylene with a catalytic system composed of:

(1) a titanium compound having the formula:

$$TiX_mY_{4-m}$$

wherein: X is a member selected from the groups:

$-NR_1R_2$;

$-SR_3$;

$R_1$, $R_2$ and $R_3$ being hydrocarbon radicals, alkyls of from 1 to 20 carbon atoms, cycloalkyls having from 4 to 6 carbon atoms, or aromatics;

$-O-C_6H_4-CH_3$ (cresyl) with the methyl substituent in the ortho, meta, or para position relative to the carbon atom bound to oxygen;

$-O-C_6H_4-O-$; and

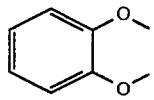

Y being a member selected from the groups $-OR_4$ and $-OOC-R_5$ ($R_4$ and $R_5$ having the same meanings as $R_1$, $R_2$ and $R_3$); m being an integer variable from 1 to 4.

(2) an alkyl derivative of an element of the groups 1A, 2A, 3A and 4A of the Periodic Table, the alkyl being of from 1 to 20 carbon atoms; the molar ratio of the component (2) to the component (1) of the catalytic system being variable in the range of from 1:1 to 10:1.

Particularly advantageous representatives of the component (1) of the catalyst are:

$Ti(N(norC_3H_7)_2)_4$ $Ti(N(norC_3H_7)_2)_2((O\text{-}norC_4H_9)_2)$ $Ti(N(norC_3H_7)_2)_2((OH_3COO)_2)$ $Ti(N(norC_3H_7)_2)_2((O-C_6H_4-CH_3)_2)$ $Ti((C_{17}H_{33}COO)_2)((O-C_6H_4-CH_3)_2)$ $Ti((O-C_6H_4-CH_3)_2)((O\text{-}norC_4H_9)_2)$ $Ti(N(norC_3H_7)_2)_2((S-C_6H_5)_2)$ $Ti((O-C_6H_4-O))((O\text{-}norC_4H_9)_2)$ As the component (2) of the catalytic system of the present invention sodium alkyls, lithium alkyls, potassium alkyls, beryllium alkyls, magnesium alkyls, magnesium alkylhalides, zinc alkyls, boron alkyls, aluminum alkyls, gallium alkyls, tin alkyls and lead alkyls are useful. Among these, aluminium trialkyls are preferred and especially those having from 1 to 8 carbon atoms in the alkyl radical.

The catalyst system is prepared by contacting the components (1) and (2) of the system in the ratios indicated above, in an anhydrous and inert organic solvent (a nonreacted solvent), such as for example hexane, cyclohexane and toluene.

A solution is therefore obtained which is maintained at a temperature of from 20° C. to 100° C. and for a time from 0.5 hour to 15 hours.

The catalyst solution thus obtained is scattered over a solid surface whereafter the solvent is driven off by vaporization under vacuum and acetylene is then fed to the so dispersed catalyst whereby the growth of the polymer in film form is induced.

The best fit temperatures for polymerization are in the range of from −80° C. to +20° C. Within such a range, an acetylene polymer is formed, which has a cis-isomer content above 40% approximately.

It is known, in fact, that the percentages of cis- and trans-isomers contained in the polymer are a function of the polymerization temperature (Reference I: J. Polym. Sci., Pol. Chem. Ed. 12, 11 (1974).

As suggested above, the polymerization run is carried out under a pressure of from 0.01 atm to 2 atm of acetylene. Higher pressures can be adopted than the top limit suggested above, but in such a case precautionary measures ought to be taken on account of the instability of acetylene to pressure.

The catalytic system of the present invention is a critical factor for obtaining polyacetylene films having the desired properties. It should be noted, in fact, that the use of titanium alcoholates having the general formula $Ti(OR)_4$, which are known as catalytic system components in the polymerization of acetylene (Reference A) originates the formation of unsatisfactory polymers, especially as far as the orientation under stretch is concerned.

By operating according to the process of the present invention acetylene polymers in film form are obtained, which, as a rule, have the following specifications:
cis-isomer content: more than about 40%
thickness: from 5 microns to 1 mm
elongation at break (l/lo): over 4
tensile strength: over 100 MPa
molecular orientation under stretch: such as to produce X-ray scatter angles, $\Delta\beta$ equal to, or narrower than 35 degrees, as will be indicated hereinafter.

As outlined above, such a number of properties cannot be found in any of the polyacetylene films of the prior art.

In connection with the last named property, this characteristic has been assessed by the X-ray diffraction test method. It is known that the X-ray diffraction figures of isotropic crystalline or semicrystalline materials are characterized by reflexions which appear in the form of continuous circles. When preferential orientation phenomena of the crystalline fractions are, instead, present, the reflexions tend to appear as arcs of circle, or, under limiting conditions, as spots proper if the orientation phenomena are particularly important. The scattering of the intensity of a single reflexion along the circumference of the circle (usually called the azimuthal scatter) can be taken as an index of the degree of preferential orientation of the material concerned. The X-ray diffraction spectra of the stretched components of polyacetylene, to which reference will be had hereinafter, have been obtained in a flat chamber and the radiation Cu k$\overline{\alpha}$ ($\lambda = 1.5418$ Å). All of the samples which have been tested showed a preferential orientation of the crystallites of a monodimensional type, with the axis c of the crystal, which coincides with the axis of the macromolecule, parallel to the direction of stretching.

This conclusion is based on data of a structural nature which are known in the literature (Reference L: J. Pol. Sci., Polym. Lett., Ed. 20, 97 (1982). An index of the degree of preferential orientation has been directly evaluated on the diffraction figure itself by measuring the total azimuthal scatter ($\Delta\beta$ in degrees, see FIG. 1) of the arc relative to the most intense reflexion which was present in the equator of the Figure at 2$\upsilon$ of 23°-24° (lattice planes 110 and 200 according to Reference L). Obviously the lowest values of $\Delta\beta$ correspond to the highest degrees of preferential orientation.

In materials such as stretched fibers and rubbers, which are characterized by high levels of preferential orientation, $\Delta\beta$ represents values of about 20° (Reference M: Makromol. Chem., 181, 1143 (1980)).

Figure 2A:
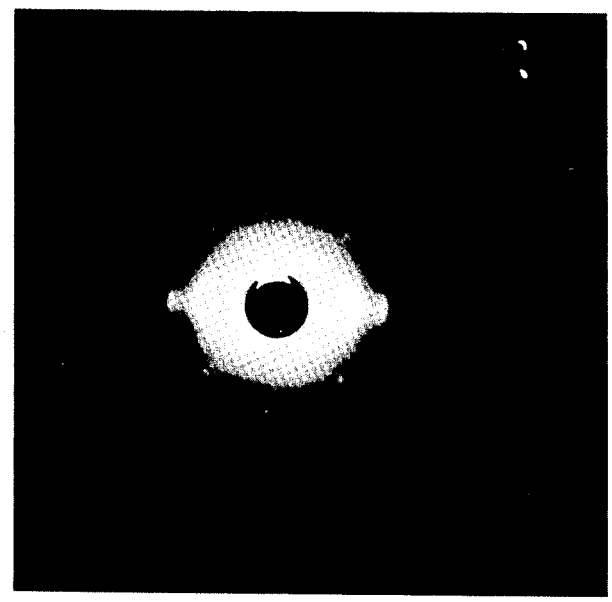
Figure 2A:
Figure 2B:
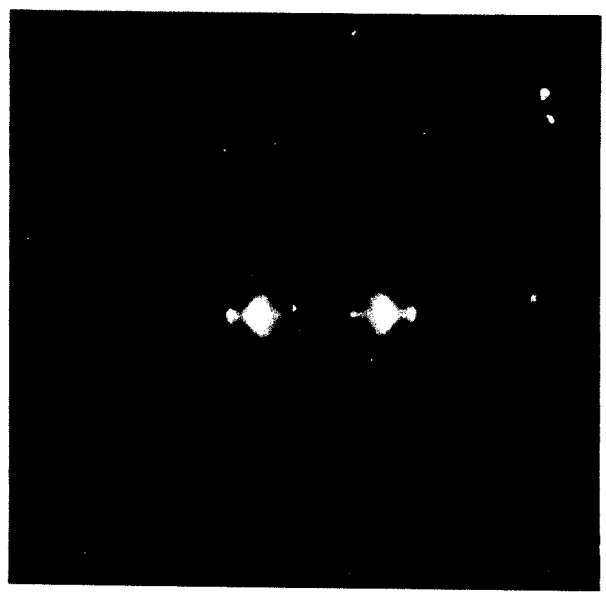
Figure 2B:

For the sake of simplification, the materials which exhibit values of $\Delta\beta$ up to 25°, from 25° to 35°, from 35° to 50° and over 50° are classified as materials of the I, II, III and the IV type, respectively (see FIG. 1). On the basis of the foregoing and with reference to the experimental examples, the polyacetylene films according to the present invention exhibit a level of preferential orientation under stretch which is surprisingly high when examining their X-ray diffraction spectra: FIGS. 2A and 2B are typical examples. More particularly:

FIG. 2A l/lo=4.5

FIG. 2B l/lo=6.5 the samples having been stretched in an Instron Model 1121 dynamometer, which can operate at room temperature, both in air and under a nitrogen blanket, with a strain rate which has been selected as $\overset{\circ}{\epsilon} = 25$ min$^{-1}$. The draw and molecular orientation properties relative to samples obtained according to the prior art have been described in the literature (Reference C, Reference N: J. Polymer. Sci., Polymer Lett., Ed. 17, 195 (1979) and Reference O: J. Polymer Scie., Polym. Phys. Ed. 18, 429 (1980).

All these references report maximum values of draw ratio 1/10 of about 3.0 and only modest values of molecular orientation are mentioned.

Figure 3:
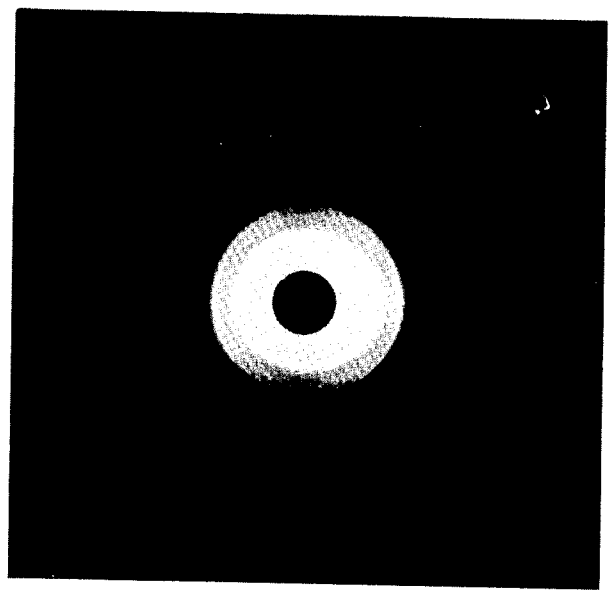
Figure 3:

We have prepared a sample according to the teachings of Reference C and have stretched it with the procedure aforementioned, with a stretch ratio l/lo=2.5. The X-ray diffraction spectrum of such stretched material is shown in FIG. 3. Also in this case, the sample has been stretched at room temperature, but the operation has been carried out under nitrogen. On comparing FIGS. 2A, 2B and 3, the considerable difference as regards the molecular orientation becomes fully conspicuous. It is furthermore apparent that the molecular orientation of the materials prepared according to the teachings of References B, C and D is actually far distant from that which can generally be attained in fibers.

The same decisive difference can be found also in the mechanical properties, as in the case of the films made according to the present invention the tensile strength is as high as more than 100 MPa, as compared with the value of about 20 MPa for the film of Reference N.

Another significant difference between the films of the present invention and those of the prior art can be seen in the behavior of the films towards oxygen.

According to Reference N, the draw ratio is extremely sensitive to oxygen and markedly decreases after one minute of exposure to air.

The films as obtained according to the present invention have been stretched after exposure to air for periods not shorter than 15 mins., but without any considerable difference from tests in which the samples were stretched under a nitrogen blanket.

The high orientation upon stretch of the films according to the present invention confers to said films important properties of optical anisotropy relative to polarization of light radiations which flow through thin layers. Such a polarization can be made conspicuous by observing the sample with an optical microscope with light which has been polarized through a Nicol prism.

The characteristic ray extinction phenomenon is detected when the direction of the fibril of the stretched sample is perpendicular to that of the polarization plane of the Nicol. The complete extinction of the ray, which can be detected by the totally dark field of the microscope, shows that the molecular orientation phenomenon involves all the fibrils of the entire sample.

Besides an anisotropy of an optical type, there is, in the films stretched according to the present invention, an electric anisotropy, which is detected by a greater conductivity of the material in the direction parallel to the stretch plane relative to perpendicular direction.

The high anisotropy detected in the stretched films according to the present invention makes such films useful in important uses in the optical field, in the preparation of electric devices such as homo- and ethero junctions, electrodes for cathodic reduction reactions, photovoltaic cells and the manufacture of electrodes for dry cells and storage batteries.

The general principles adopted for the preparation of the catalytic system and the polymerization of acetylene in the presence of such catalytic system will now be reported hereinafter. All the operations are performed with the rigorous of both oxygen and moisture and with the solvents having been previously dehydrated and deaerated, consistently with the technological rules as usually adopted for this purpose.

Preparation of the catalyst system

A three-necked flask fitted with a reflux condenser and maintained under a nitrogen blanket is charged, in the order given, with the solvent hexane, the titanium compound and the aluminum alkyl in such an amount as to have an atomic ratio of Al to Ti equal to 4/1.

A solution is obtained, which is maintained at the boiling point temperature of the solvent under atmospheric pressures, for a time of 10 hours.

Then, the mixture is allowed to cool to room temperature and the solution of catalyst thus obtained is utilized for the subsequent polymerization of acetylene.

Polymerization of acetylene

Figure 4:
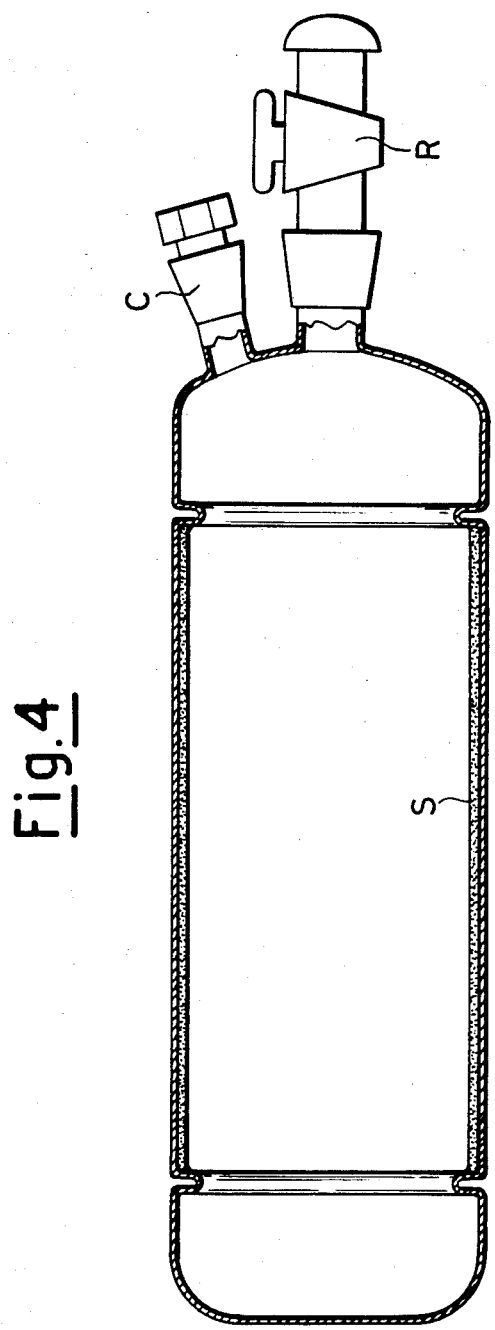

The polymerization of acetylene is carried out in a large test-tube (such as that illustrated in FIG. 4), which is maintained in a horizontal position and in which is introduced the quantity of the catalyst solution (prepared as hereinbefore specified) which contains 1 milligramatom (mgA) of Titanium. Having reference to FIG. 4, the test tube is connected via the ground glass cone C to a mechanical vacuum pump. The test tube is then driven to rotation while simultaneously opening the cock R in a gradual manner. The solvent hexane of the catalyst solution is slowly evaporated, and, due to the effect of the rotation, the result is obtained of the deposit of a liquid and viscous layer (S) on the inner wall of the test tube.

On completion of the evaporation of the solvent, the layer deposited on the walls is no longer free-flowing, even when the test tube is turned up to vertical position. At this stage the cock R is closed and the evacuated test tube is placed in a bath which is thermostatically controlled to the desired temperature and is connected to an apparatus in which acetylene is maintained at a constant pressure of 600 mmHg (millimeters of mercury). Through R the gas is contacted with the catalyst layer and polymerization proceeds with the formation of a film polymer on the surface of the catalyst.

On the polyacetylene film sticking to the test tube walls, the operation of formation of a second catalyst layer can be repeated with the same procedure as adopted to form the first layer. The polymerization run can thus be repeated several times until obtaining a film having the expected thickness.

Once that the desired amount of acetylene has been absorbed, the polymerization is discontinued by driving off the residual gas and the polymer film adhering to the test tube wall is recovered. Such a film is washed by soaking it entirely with an aliphatic or an aromatic organic solvent (examples: hexane, toluene, and such-like) at the same temperature at which polymerization took place.

The catalyst is thus passed to the liquid phase, wherefrom it can be recovered to be reused. The washing step is continued until such time as the solvent becomes colorless.

At this stage the polymer is dried under a vacuum as obtained with a mechanical pump and a homogeneous film is recovered, which shows quite characteristic a metallic glitter.

With reference to the attached TABLE 1, the Examples from 1 to 6 relate to the polymerization of acetylene with the catalysts of the present invention and according to procedure described hereinabove.

Examples 7 and 8 are comparison examples and, more particularly, Example 7 is conducted according to Example 1 of reference C and Example 8 is conducted according to reference O (reference No. 3).

The films as obtained according to the Example from 1 to 8 are cut under a nitrogen blanket in strips having the dimensions of 0.5 by 5 centimeters (cm) and are compared with each other on the basis of draw ratio (1/10=alpha), of the tensile strength and the degree of preferential orientation after stretching $\Delta\beta$. The results are tabulated in the attached Table 2.

TABLE 1

| Example No | CATALYTIC SYSTEM Component (1) | Component (2) | Molar Ratio Comp. 2:Comp. 1 | Polymer. temp. °C. | Cis unit content % (+) |
|---|---|---|---|---|---|
| 1 | $Ti((cresyl)_2)((O\text{—}norC_4H_9)_2)$ | $Al(C_2H_5)_3$ | 4 | −78 | 90 |
| 2 | $Ti((cresyl)_2)((O\text{—}norC_4H_9)_2)$ | $Al(C_2H_5)_3$ | 4 | −50 | 80 |
| 3 | $Ti((cresyl)_2)((OOC\text{—}C_{17}H_{33})_2)$ | $Al(C_2H_5)_3$ | 4 | −50 | 80 |
| 4 | $Ti(N(norC_3H_7)_2)_2((O\text{—}norC_4H_9)_2)$ | $Al(C_2H_5)_3$ | 4 | −40 | 65 |
| 5 | $Ti(N(norC_3H_7)_2)_2((cresyl)_2)$ | $Al(C_2H_5)_3$ | 4 | −30 | 60 |
| 6 | $Ti(N(norC_3H_7)_2)_2((O\text{—}norC_4H_9)_2)$ | $Al(C_2H_5)_3$ | 4 | −30 | 60 |
| 7 | $Ti(O\text{—}norC_4H_9)_4$ | $Al(C_2H_5)_3$ | 4 | −78 | 90 |
| 8 | $Ti(O\text{—}norC_4H_9)_4$ | $Al(C_2H_5)_3$ | 4 | −78 | 90 |

(+) Calculated as reported in Reference 1.

TABLE 2

| Example | Conditions of draw | Elongation at break (+) (l/lo) | Tensile Strength (+) MPa | Material Type (++) |
|---|---|---|---|---|
| 1 | In air at 25° C. | 6.5 | 120 | I |
| 1 | Previously exposed to air 20 mins and then stretched in air at 25° C. | 5.8 | 112 | I |
| 2 | In air at 25° C. | 5.8 | 110 | I |
| 3 | In air at 25° C. | 5.5 | 115 | I |
| 4 | In air at 25° C. | 4.5 | 104 | II |
| 5 | In air at 25° C. | 4.7 | 106 | II |
| 6 | In air at 25° C. | 5.0 | 110 | II |
| 7 | Under nitrogen at 25° C. | 2.9 | 16 | III |
| 8 | Under nitrogen at 25° C. | 2.5 | 12 | IV |

(+) Measured with Instron Mod.1121 apparatus ($\dot{\epsilon} = 25\ min^{-1}$)
(++) Please refer to FIG. 1

The films made according to the present invention take unpredictably high values of specific electric conductivity upon doping with iodine, said values of specific electric conductivity reaching their top magnitude, for the same iodine amount, when the polyacetylene films are previously drawn with a draw ratio equal to, or higher than 6.

More particularly, such stretched polyacetylene films doped with iodine take values of electric specific conductivity along the direction of stretch which exceed by one order or denomination that of similar films which have not been stretched though having been doped with the same amount of doping agent.

In addition, the polyacetylene doped films according to the present invention show values of specific electric conductivity which are unexpectedly high relative to polyacetylene films doped with the same amount of dopant, but prepared according to the conventional art.

Consistently with these results, according to an aspect of the present invention the polyacetylene films are subjected to doping, after being previously stretched with a draw ratio of 6 or higher, or without having previously been stretched, the doping with iodine being such as to attain a maximum of iodine content in the film of 17% molar, to produce doped and optionally pre-stretched polyacetylene films having values of the specific electric conductivity δ up to a top value of about 2,000 $ohm^{-1}\ cm^{-1}$.

The draw ratio is defined by the expression:

$$\alpha = 1 + (l\text{-}lo/lo)$$

wherein lo is the initial length of the polyacetylene film and l is the length of the same film after drawing.

According to an embodiment, the polyacetylene film, optionally stretched with a draw ratio of about 6 or higher, is subjected to isomerization for converting it into the predominant "trans" form, prior to doping the film with iodine. Typically, isomerization is carried out at a temperature in the neighborhood of 200° C. for a time of a few minutes (for example 5 mins.) by maintaining the film under a helium stream.

Also these isomerized and optionally stretched polyacetylene films exhibit, after their doping with iodine, values of specific electric conductivity, δ, which may attain about 2,000 $ohm^{-1} cm^{-1}$.

Doping can be carried into effect by contacting the polyacetylene film, optionally stretched and isomerized, with iodine vapors, working at a temperature of from −10° C. to 50° C. According to another embodiment, the film, optionally stretched and isomerized, is contacted by a solution of iodine in a hydrocarbonaceous solvent, such as pentane, still working within the temperature range suggested above. At any rate the times of contact are so monitored as to provide a iodine content in the film up to a 17 molar%.

EXAMPLE 9

A three-necked flask, equipped with a reflux condenser and maintained under a nitrogen stream, is charged, in the order given, with: solvent hexane, Ti[(-cresyl)$_2$] [(O-norC$_4$N$_9$)$_2$] and Al(C$_2$H$_5$)$_3$ with an atomic ratio of Al to Ti equal to 4:1.

A solution is obtained which is maintained at the boiling point temperature for the solvent, under atomspheric pressures, for 10 hours. Thereafter, the mixture is allowed to cool at room temperature.

A horizontal large test tube is charged with a quantity of catalytic solution, prepared as described above, and containing 2 mgA of titanium. The test tube is connected to a vacuum source and is driven to rotation so as slowly to evaporate off the solvent hexane and to obtain the deposition of a liquid and viscous layer of catalyst on the interior wall of the test tube. The test tube is then positioned vertically in a bath thermostatically controlled to −40° C. and is connected to an apparatus which contains gaseous acetylene under a constant pressure of 600 mmHg. Acetylene polymerizes on the inner wall of the test tube in the form of a 0.1 mm-thick film. This film is washed by entirely soaking it in hexane, working at the polymerization temperature, so as to solubilize the hexane phase. Washing is continued until such time as the solvent is colorless. At this stage, the polyacetylene film is dried under vacuum and recovered.

There is obtained in this way a film having quite characteristic a metallic glitter and a value of the specific surface equal to about 400 cm².

From such a film, tapes are cut having the dimensions of 3 by 6 cm which are stretched in an Instron Mod. 1121 machine testing at a strain rate $\dot{\epsilon}$ of 25 min$^{-1}$.

The tapes have the following characteristics:
cis unit content 75% trans units: 25%
elongation at break (l/lo): 7,5
tensile strength: 140 MPa In the ensuing examples the polyacetylene film as prepared in the way described hereinabove is doped. More particularly, the doping step in the gaseous phase is carried out in a glass apparatus connected to a vacuum pump and to which a vessel containing gaseous iodine and another vessel containing the polyacetylene film prepared as described above are connected.

EXAMPLE 10

A tape cut from polyacetylene prepared according to EXAMPLE 9, stretches in an Instron machine up to a draw ratio alpha equal to 7.5 is subjected to isomerization at 200° C. for 5 minutes in a helium stream. Thus a polyacetylene is obtained which has a content of trans units over 95%, which is treated, in the manner specified above, with gaseous iodine up to an absorption of a quantity of 15 molar%.

The tape thus doped exhibits a specific conductivity $\delta$ equal to 2,000 ohm$^{-1}$cm$^{-1}$ in the direction of stretching.

EXAMPLE 11

The procedure of EXAMPLE 10 is adopted but omitting the isomerization step. By doping with iodine there is obtained a polyacetylene tape containing a quantity of iodine equivalent to 13 molar%, which has a specific conductivity $\delta$ equal to 1,800 ohm$^{-1}$cm$^{-1}$ in the direction of stretching.

EXAMPLE 12

A polyacetylene tape prepared according to EXAMPLE 9 is subjected to isomerization according to the procedure of EXAMPLE 10 with no stretching and is then doped up to a quantity of iodine of 15 molar%. The so doped sample has a specific conductivity $\delta$ equal to 160 ohm$^{-1}$cm$^{-1}$.

EXAMPLE 13

A polyacetylene tape prepared according to EXAMPLE 9, is doped under no stretching with a quantity of iodine equivalent to an absorption of 15 molar%. The sample so doped has a conductivity $\delta$ equal to 160 ohm$^{-1}$cm$^{-1}$.

We claim:

1. A process for producing a polyacetylene film having:
   (a) a thickness from 5 microns to 1 mm;
   (b) a content of cis isomer greater than about 40%;
   (c) an elongation at break (L/LO) which at 25° C. is in the range of 4 to about 7.5;
   (d) A tensile strength over 100 MPa;
   (e) a molecular orientation under stretch such as to produce scattering of X-rays, $\Delta\beta$ being equal to our lower than 35°;

said process comprising polymerizing acetylene in film form at a temperature of from $-100°$ C. to $+100°$ C. and under an acetylene pressure of from 0.01 atmosphere to 2 atmospheres by directly contacting monomeric acetylene with a two component catalyst system which consists of (1) a member of the group consisting of:

$Ti(N(norC_3H_7)_2)_4$ $Ti(N(norC_3H_7)_2)_2$ $((O-norC_4H_9)_2)$ $Ti(N(norC_3H_7)_2)_2$ $((CH_3COO)_2)$ $Ti(N(norC_3H_7)_2)_2$ $((O-C_6H_4-CH_3)_2)$ $Ti(N(C_{17}H_{33}COO)_2)$ $((O-C_6H_4-CH_3)_2)$ $Ti((O-C_6H_4-CH_3)_2)$ $((O-norC_4H_9)_2)$ $Ti(N(norC_3H_7)_2)_2$ $((S-C_6H_5)_2)$ $Ti((O-C_6H_4-O))$ $((O-norC_4H_9)_2)$;

and
(2) a member of the group consisting of: sodium alkyls, lithium alkyls, potassium alkyls, beryllium alkyls, magnesium alkyls, magnesium alkyl halides, zinc alkyls, boron alkyls, aluminum alkyls, gallium alkyls, tin alkyls and lead alkyls, wherein said alkyls have from 1 to 8 carbon atoms.

2. A process as defined in claim 1 wherein the elongation at break is 4.5.

3. A process as defined in claim 1 wherein the elongation at break is 7.5.

4. A process as defined in claim 1 wherein the elongation at break is 5.8.

5. A process as defined in claim 1 wherein the elongation at break is 4.7.

6. A process as defined in claim 1 wherein the elongation at break is 5.0.

7. A process according to claim 1, characterized in that said component (2) of the catalytic system is an aluminum trialkyl with 1 to 8 carbon atoms in the alkyl.

8. A process according to claim 1, characterized in that the components (1) and (2) of the catalytic system are contacted in an anhydrous and inert solvent at a temperature of from 20° to 100° C. to obtain a catalyst solution, and thereafter the catalytic system is deposited on a solid surface by contacting said solution with a solid surface and evaporating the inert solvent.

9. A process according to claim 8 characterized in that said inert solvent is a member selected from the group consisting of hexane, cyclohexane and toluene.

10. A process according to claim 1, characterized in that the polymerization temperature is comprised in the range from $-80°$ C. to 20° C.

* * * * *

UNITED STATES PATENT AND TRADEMARK OFFICE
CERTIFICATE OF CORRECTION

PATENT NO. : 4,600,756

DATED : July 15, 1986

INVENTOR(S) : Pedretti, et al

It is certified that error appears in the above—identified patent and that said Letters Patent is hereby corrected as shown below:

On the title page of the patent, left column, at the item designated [73], after "Assignee:" eliminate "Enichimica S.p.A., Milan, Italy" and insert --ANIC S.p.A. (Palermo, Italy) and AGIP Nucleare S.p.A. (Rome, Italy)--.

Signed and Sealed this

Eleventh Day of November, 1986

Attest:

DONALD J. QUIGG

Attesting Officer

Commissioner of Patents and Trademarks